(12) United States Patent
Sugimoto et al.

(10) Patent No.: US 9,404,450 B2
(45) Date of Patent: Aug. 2, 2016

(54) AIR PURIFICATION DEVICE FOR VEHICLES

(75) Inventors: Kazuhiro Sugimoto, Susono (JP); Yoshihisa Shinoda, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 170 days.

(21) Appl. No.: 14/008,387

(22) PCT Filed: Mar. 31, 2011

(86) PCT No.: PCT/JP2011/058187
§ 371 (c)(1),
(2), (4) Date: Sep. 27, 2013

(87) PCT Pub. No.: WO2012/131966
PCT Pub. Date: Oct. 4, 2012

(65) Prior Publication Data
US 2014/0013953 A1    Jan. 16, 2014

(51) Int. Cl.
*B01D 53/02* (2006.01)
*F02M 35/02* (2006.01)
*B01D 53/66* (2006.01)
*B01D 53/26* (2006.01)

(52) U.S. Cl.
CPC ........... *F02M 35/0218* (2013.01); *B01D 53/66* (2013.01); *B01D 53/265* (2013.01); *B01D 2253/102* (2013.01); *B01D 2258/06* (2013.01); *B01D 2259/4566* (2013.01)

(58) Field of Classification Search
CPC ..................... B01D 2253/102; B01D 2258/06; B01D 2259/4566; B01D 53/265; B01D 53/66; F02M 35/0218

See application file for complete search history.

(56) References Cited

U.S. PATENT DOCUMENTS

| 6,212,882 | B1 | 4/2001 | Greger et al. | |
|---|---|---|---|---|
| 2002/0172633 | A1* | 11/2002 | Koermer et al. | 423/219 |
| 2005/0100492 | A1* | 5/2005 | Hoke et al. | 423/219 |

FOREIGN PATENT DOCUMENTS

| DE | 100 85 020 | 12/2002 |
|---|---|---|
| JP | 59-101531 | 6/1984 |
| JP | 2002-514966 | 5/2002 |
| WO | WO 96/22146 | 7/1996 |
| WO | WO 2012/127643 | 9/2012 |

* cited by examiner

*Primary Examiner* — Christopher P Jones
(74) *Attorney, Agent, or Firm* — Finnegan, Henderson, Farabow, Garrett & Dunner, LLP

(57) ABSTRACT

The present invention relates to an air purification device for vehicles and the purpose of the present invention is to provide a DOR (Direct Ozone Reduction) system which suppresses deterioration in purifying function of the ozone purifier. Ozone purification rate of activated carbon correlates with probability that gas is contacted with the radiator. Also, wind velocity of the gas passing through a radiator correlates with car speed. Therefore, the ozone purification rate of the activated carbon correlates with the car speed, The grill shutter 22 is controlled in fully open condition when the car speed is within an area faster than Speed A shown in FIG. 6. When the car speed is slower than Speed A, the grill shutter 22 is controlled in closed condition as shown in FIG. 2 (A).

8 Claims, 9 Drawing Sheets

100

AIR PURIFICATION DEVICE FOR VEHICLES

CROSS-REFERENCE TO RELATED APPLICATIONS

This application is a national phase application of International Application No. PCT/JP2011/058187, filed Mar. 31, 2011, the content of which is incorporated herein by reference.

TECHNICAL FIELD

The present invention relates to an air purification device for vehicles and to an air purification device for vehicles capable of purifying ozone in atmospheric air.

BACKGROUND ART

Ozone, which causes photochemical smog, is produced by a photochemical reaction of HC and NOx contained in exhaust gases from vehicles and factories, Therefore, reducing the amount of emissions of BC and NOx from vehicles is an efficient way to suppress the production of ozone and the occurrence of photochemical smog. Also, purifying ozone in the atmospheric air directly can be one of the ways to prevent the occurrence of photochemical smog. By purifying ozone as a product as well as reducing the amount of emissions of BC and NOx as reactants, the occurrence of photochemical smog can be prevented more effectively. In this respect, an vehicle including an air purification device for vehicles capable of directly purifying ozone in the atmospheric air has been put into practical use in some places including California in the United States of America. This air purification device for vehicles, specifically, is called a DOR (Direct Ozone Reduction) system.

For example, Patent Literature 1 discloses a DOR system in which a metal oxide such as manganese dioxide is supported by an on-vehicle component. An on-vehicle component such as a radiator is disposed at a spot in contact with atmospheric air during travel of the vehicle, and manganese dioxide has a function of converting ozone contained in the air into other substances such as oxygen, and purifying ozone. Therefore, according to the DOR system disclosed in Patent Literature 1, ozone in the atmospheric air can be directly purified during travel of the vehicle.

For example, Patent Literature 2 discloses a devise for vehicles which includes shutters disposed in the front of a radiator and driven to be opened and closed by an actuator, and controls the actuator so that the shutters close when engine coolant temperature is low. When the atmospheric temperature is low in cold climates and elsewhere, coolant temperature is disturbed to rise. So, if the shutters are closed, then room temperature in a vehicle can be raised earlier and warming-up time can be shortened.

CITATION LIST

Patent Literature

Patent Literature 1: National Publication of International Patent Application No. 2002-514966
Patent Literature 2: Japanese Patent Laid-Open Publication No, S59-101531

SUMMARY OF INVENTION

It has been known that not only metal oxide such as manganese dioxide but also activated carbon has a function of purifying ozone. Since the activated carbon has the function of purifying ozone as well as the metal oxide and is available at moderate price, it has been expected to be used as an alternative to the metal oxide. The activated carbon can purify ozone at ambient temperature (25° C.) and thus has an advantage over the metal oxide which purifies ozone at a higher temperature than the ambient temperature. However, there is a problem that when the activated carbon is used as an ozone purifier, its ozone purifying function is easily deteriorated.

FIG. 9 is a diagram illustrating a temporal change of ozone purification rate (%) of activated carbon. A solid line of FIG. 9 corresponds to ozone purification rate of activated carbon and a dashed line of the figure corresponds to that of manganese dioxide for comparison. As shown in FIG. 9, purification rate of the activated carbon is equivalent to that of the manganese dioxide in an early stage. However, the purification rate of the activated carbon goes with endurance time below that of the manganese dioxide and then falls down to one-half after a long time.

The reason why the ozone purifying function of the activated carbon is easily deteriorated lies in how the function works. That is, active oxygen may be produced in addition to oxygen when the activated carbon dissolves ozone. Since the active oxygen has stronger oxidizing power than the ozone, it easily reacts with the activated carbon to oxidize it. Accordingly, when the activated carbon is simply applied to the DOR system, an on-vehicle component carrying it needs to be exchanged frequently. Thus, it is not practical and needs further improvement.

The present invention has been made in view of the above-described circumstances. It is an object to provide a DOR system which suppresses deterioration in purifying function of the ozone purifier.

Means for Solving the Problem

To achieve the above mentioned purpose, a first aspect of the present invention is an air purification device for vehicles, comprising:

an on-vehicle component arranged on a portion where an air flow passage is formed while a vehicle is moving;

an ozone purifier which includes activated carbon while being provided on said on-vehicle component;

air inflow control means for controlling amount of air flowing into said ozone purifier; and control means for controlling said inflow control means so that amount of air flowing into said ozone purifier is reduced in a case where a condition of environment surrounding a moving vehicle is within a deterioration progression determination area of said ozone purifier as compared to a case where said condition is out of said deterioration progression determination area.

A second aspect of the present invention is the air purification device for vehicles according to the first aspect, wherein said deterioration progression determination area is a speed area where speed of air flowing through said ozone purifier becomes slower than a set speed.

A third aspect of the present invention is the air purification device for vehicles according to the second aspect, wherein said on-vehicle component is a radiator, and said set speed is decided based on a vehicle speed and an operating voltage of a radiator fan which cools said radiator.

A fourth aspect of the present invention is the air purification device for vehicles according to any one of the first to the third aspects, wherein said on-vehicle component is a radiator, and said air inflow control means is a grill shutter which adjusts transitable area of a bumper grill by being switched to open and close.

Advantageous Effects of Invention

According to the first aspect of the present invention, the inflow control means is controlled so that amount of air flowing into the ozone purifier is reduced in a case where a condition of environment surrounding a moving vehicle is within a deterioration progression determination area of the ozone purifier as compared to a case where the condition is out of the deterioration progression determination area thereby the condition where ozone purifying function of the ozone purifier is easily deteriorated can be avoided. Therefore, a progression of deterioration in purifying function of the ozone purifier can be suppressed thereby the life of the on-vehicle component can be extended.

According to the second aspect of the present invention, the inflow control means can be controlled so that the amount of air flowing into the ozone purifier is reduced in a case where the speed of air flowing through the ozone purifier is within a speed area slower than a set speed as compared to a case where the speed is within a speed area faster than the set speed. Air speed flowing through the ozone purifier correlates with progression of deterioration in purifying function thereof. Thus, the present invention makes it possible to suppress successfully progression of deterioration in purifying function of the ozone purifier.

According to the third aspect of the present invention, as a preferable embodiment, above-mentioned set speed can be decided based on a vehicle speed and an operating voltage of a radiator fan which cools the radiator. According to the fourth aspect of the present invention, as a preferable embodiment, amount of air flowing into the ozone purifier can be controlled by a grill shutter.

DESCRIPTION OF EMBODIMENTS

[Configuration of an Air Purification Device for Vehicles]

Figure 1:
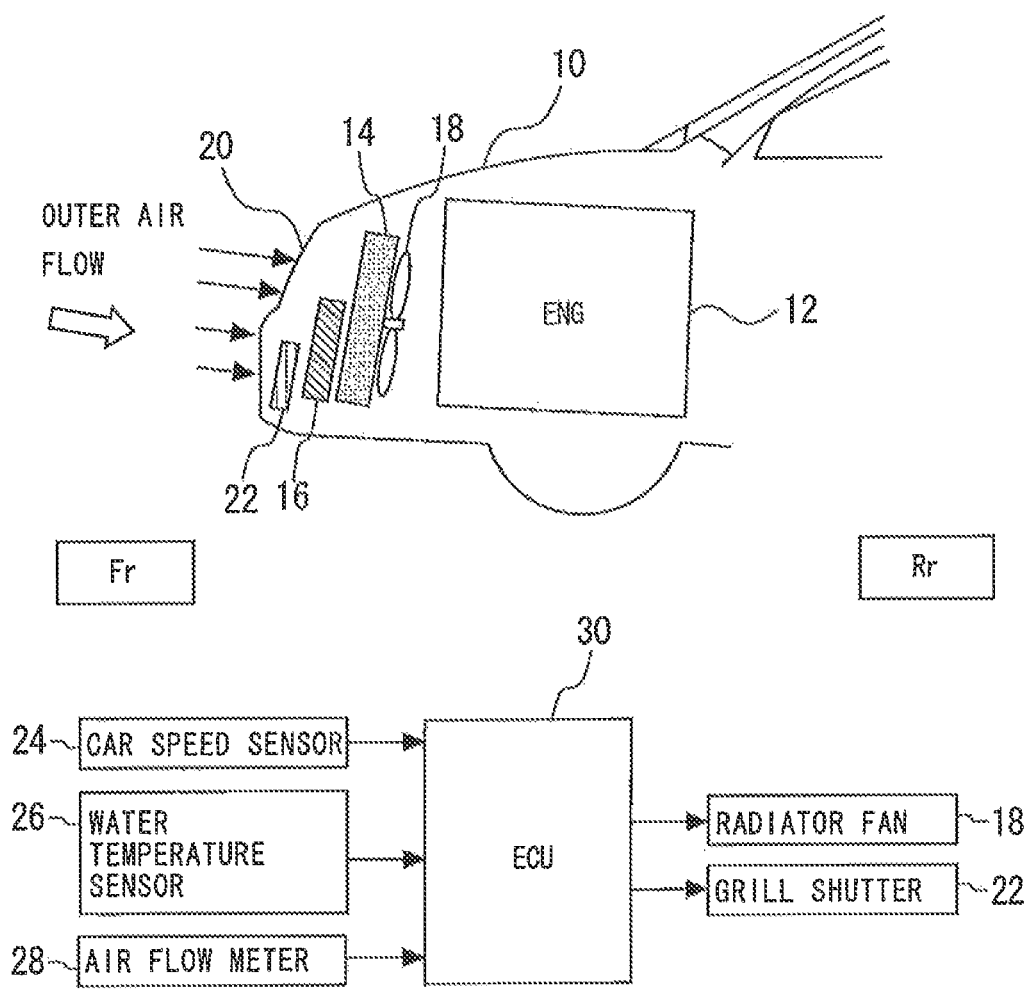
FIG. 1 is a schematic view showing a structure of a vehicle 10 on which an air purification device according to an embodiment of the present invention is applied.

An embodiment of the present invention will be explained below with reference to FIGS. 1 to 8. FIG. 1 is a schematic view showing a structure of a vehicle 10 on which an air purification device according to the embodiment is applied. The vehicle 10 includes an engine 12 serving as a power unit. The exhaust gas discharged from the engine 12 contains HC and NOx. Ozone is produced by photochemical reaction between HC and NOx as reactants. Therefore, the air purification device for vehicles is applied on the vehicle 10 comprising the engine 12, the ozone is purified while the vehicle 10 is moving, and thus, the damage to the environment caused due to the vehicle 10 can be reduced.

In the vehicle 10, a radiator 14 for cooling coolant circulating through the engine 12 is arranged on the front side of the engine 12. Louvered-fins (not shown) are provided at the core of the radiator 14. Activated carbon as an ozone purifier is coated on the fins. A capacitor 16 of an air conditioner is mounted on the front side of the radiator 14. A radiator fan 18 is mounted on the reverse side of the radiator 14.

As shown by arrows in FIG. 1, outer air is taken in through an opening of a bumper grill 20 arranged on a front surface of the vehicle 10 while the vehicle 10 is moving and the taken air is delivered through the capacitor 16 and the radiator 14 in this order to be discharged to the rear side. Even while the vehicle 10 is stopping, an air flow passage from the opening of the bumper grill 20 through the capacitor 16 to the radiator 14 is formed by the revolution of the radiator fan 18. In the vehicle 10, an electrically-operated grill shutter 22 is arranged between the capacitor 16 and the bumper grill 20.

Further, the air purification device according to the embodiment includes an ECU (Electronic Control Unit) 30 as a control unit. The radiator fan 18, the grill shutter 22 and the like are connected to an output side of the ECU 30. A car speed sensor 24 for detecting speed of the vehicle 10 (hereinafter simply referred to as "car speed"), a water temperature sensor 26 for detecting the temperature of the coolant of the engine 12, an air flow meter 28 for detecting the quantity of air to be taken into the engine 12 and the like are connected to an input side of the ECU 30. The ECU 30 enables to control various actuators such as the radiator fan 18, the grill shutter 24 and the like based on signals from the speed sensor 24 and the like.

[Operation of the Grill Shutter 22]

Figure 2:
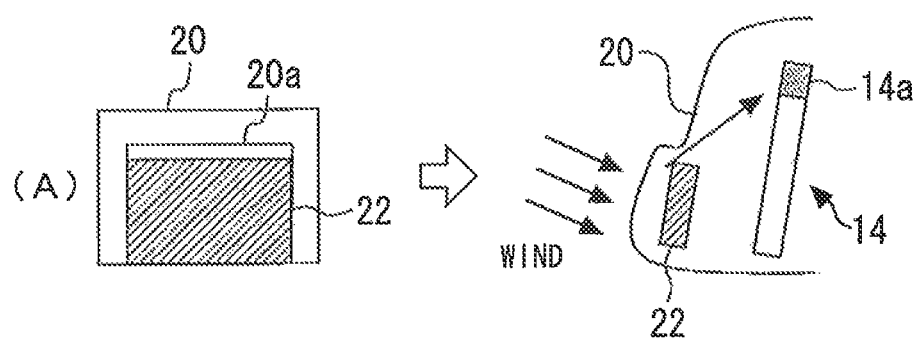
FIG. 2 is a diagram for explaining an operation of a grill shutter 22.
Figure 2:
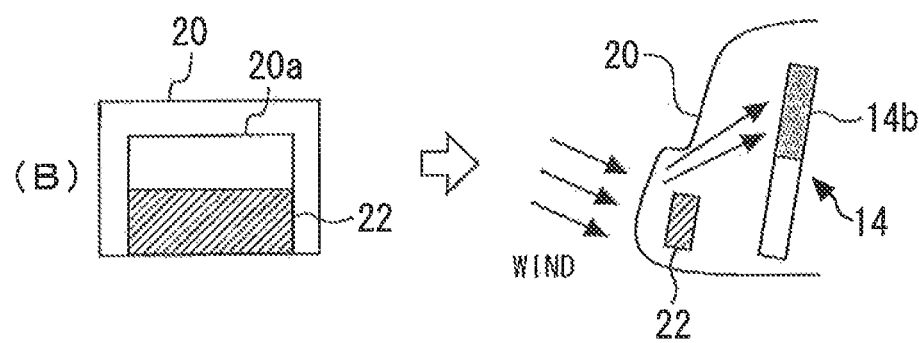

Next, an operation of the grill shutter 22 will be described with reference to FIG. 2. In FIG. 2, the two figures in the left side are the front views of the bumper grill 20 and the two figures in the right side are the side views of the vehicle 10 corresponding to the front views, respectively. When the engine 12 is stopping, the grill shutter 22 is opened. It turns to be closed to shut the opening of the bumper grill 20 by a command from the ECU 30 after the engine's start-up.

That is, an opening 20a of the bumper grill 20 is nearly closed when the grill shutter 22 is in closed condition as shown in FIG. 2 (A). Therefore, the taken air in through the opening 20a is delivered only from the upper region 14a of the radiator 14 and is then flowed thereinto. On the other hand, the opening 20a is partly opened when the grill shutter 22 is closed as shown in FIG. 2 (B). Therefore, the taken air in through the opening 20a of the bumper grill 20 is delivered from the upper half region 14b of the radiator 14 and is then flowed thereinto. By closing the grill shutter 22 in this manner, amount of air flown into the radiator 14 can be controlled while meeting a cooling requirement from the radiator 14 to some extent.

[Characteristics of Embodiment]

Figure 3:
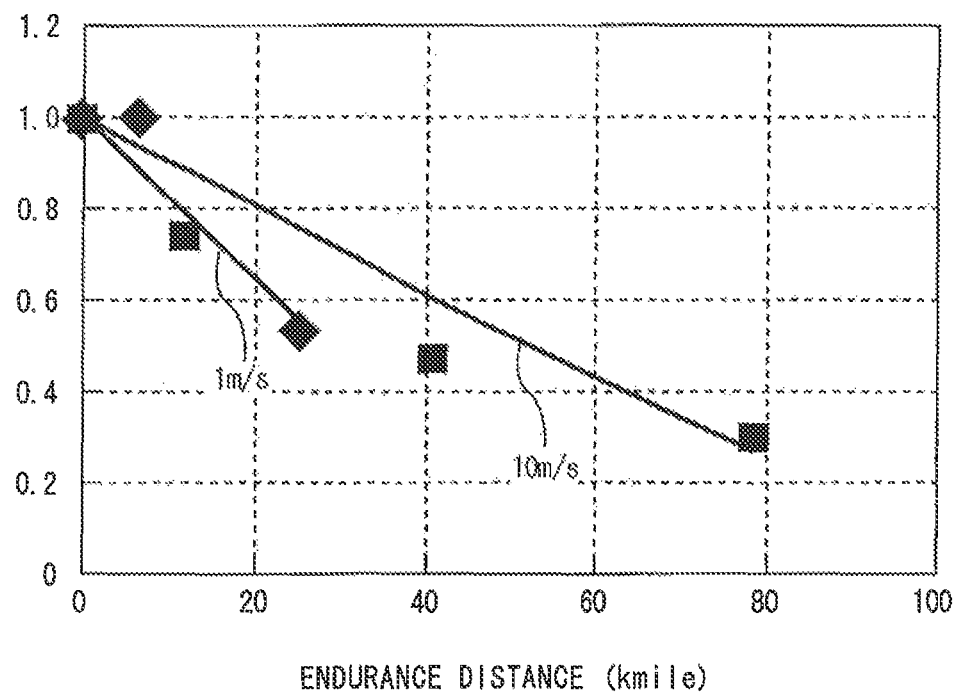
FIG. 3 is a data showing results of an ozone purification endurance test.

FIG. 3 is a data showing results of an ozone purification endurance test. In FIG. 3, the horizontal axis represents an endurance distance (in kilomiles) and the vertical axis represents a relative value based on an ozone purification rate at an initial state (when the endurance distance is 0 kilomiles). The data shown in FIG. 3 is obtained by preparing two activated carbons of equivalent sizes and specific surface areas, and then measuring the rear side ozone concentration of the two activated carbons when a gas containing ozone having a predetermined concentration passes through these activated carbons from the front side toward the rear side at different velocities (wind velocities of 1 m/s and 10 m/s).

As shown in FIG. 3, the ozone purification rate of the activated carbon is reduced as the endurance distance becomes longer. Also, as shown in FIG. 3, the degree of reduction of the ozone purification rate of the activated carbon is changed depending on the wind velocity of the passing gas containing ozone. More specifically, in the case where the gas containing the ozone passes at the wind velocity of 1 m/s, the ozone purification rate goes down by half from the ozone purification rate at the initial state when the endurance distance is approximately 30 kilomiles. In the case where the gas containing the ozone passes at the wind velocity of 10 m/s, the ozone purification rate remains at about 70% or more of the ozone purification rate at the initial state when the endurance distance is approximately 30 kilomiles, and then goes down by half from the purification rate at the initial state when the endurance distance is approximately 60 kilomiles. In other words, the degree of reduction of the ozone purification rate is smaller when the gas passes at high speed (wind velocity of 10 m/s) as compared to when the gas passes at low speed (wind velocity of 1 m/s).

Figure 4:
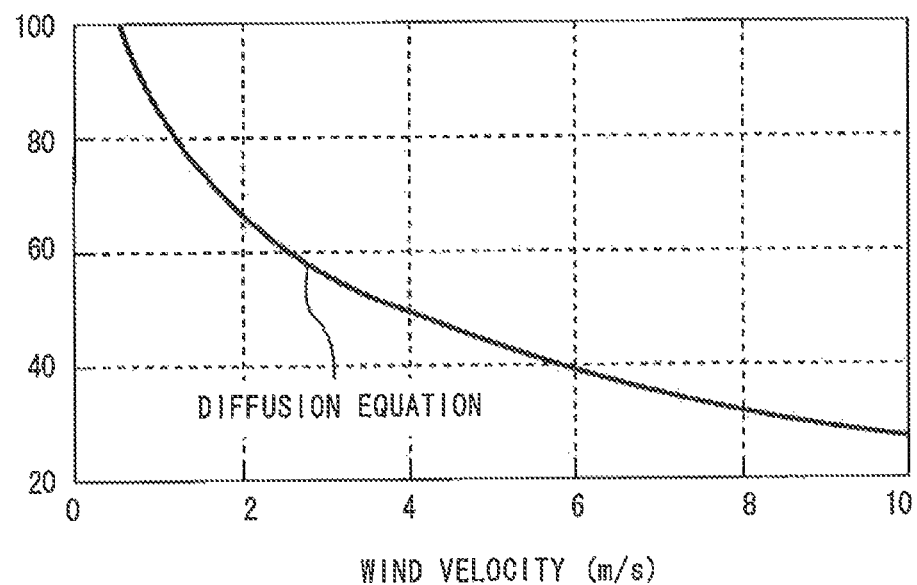
FIG. 4 is a graph showing a relationship between wind velocity of gas passing through a radiator and probability that the gas is contacted with the radiator.

FIG. 4 is a graph showing a relationship between wind velocity of gas passing through a radiator and probability that the gas is contacted with the radiator (hereinafter referred to as "gas contact probability"). This graph is provided by applying the Gormley-Kennedy diffusion equation to a model of an aluminum honeycomb radiator. As shown in FIG. 4, the probability that the gas is contacted with the radiator is approximately 100% when the wind velocity is approximately 1 m/s. Also, the probability that the gas is contacted with the radiator is decreased to approximately 10% when the wind velocity is approximately 10 m/s. In other words, the probability that the gas is contacted with the radiator is high when the wind velocity is slow, and is gradually lowered as the wind velocity is faster.

From the graphs shown in FIGS. 3 and 4, it is found that the ozone purification rate correlates with the gas contact probability. It is found from the graph shown in FIG. 4 that the gas contact probability is higher as the wind velocity decreases and the gas contact probability becomes lower as the wind velocity increases. Also, it is found from the graph shown in FIG. 3 that the degree of reduction of the ozone purification rate becomes larger as the wind velocity decreases and the degree of reduction of the ozone purification rate is smaller as the wind velocity increases. Accordingly, from the graphs in FIGS. 3 and 4, it is obvious that the degree of reduction of the ozone purification rate of the activated carbon becomes greater as the gas contact probability increases and the degree of reduction of the ozone purification rate of the activated carbon becomes smaller as the gas contact probability decreases.

The inventors estimate the reason why the ozone purification rate correlates with the gas contact probability is an ozonolysis mechanism of the activated carbon and aging of the inner structure of the activated carbon. First, the ozonolysis mechanism of the activated carbon will be explained below. The activated carbon has countless fine pores extend from its surface toward its inner side. When ozone molecules enter into such fine pores, electrons are provided from the activated carbon and activation energy of an ozonolysis reaction is reduced. Consequently, ozone is converted into oxygen and active oxygen ($O_3 \rightarrow O_2 + O^*$).

Next, the aging of the inner structure of the activated carbon will be explained below. In the air, various substances other than ozone exist and some substances eliminate the ozone purifying function of the activated carbon when entering into the fine pores. If SOx, NOx, COx or PM, for example, is adsorbed inner the fine pores of the activated carbon, it reduces the space into which ozone can enter. Then, it is likely to accelerate the deterioration of ozone purifying function of the activated carbon. In addition, active oxygen produced by the ozonolysis reaction of the activated carbon serves as an oxidant of the activated carbon. As the active oxygen has strong oxidizing power, the activated carbon would be oxidized if the active oxygen enters into the fine pores of the activated carbon. Then, it is possible that the ozone purifying function of the activated carbon disappear.

Figure 5:
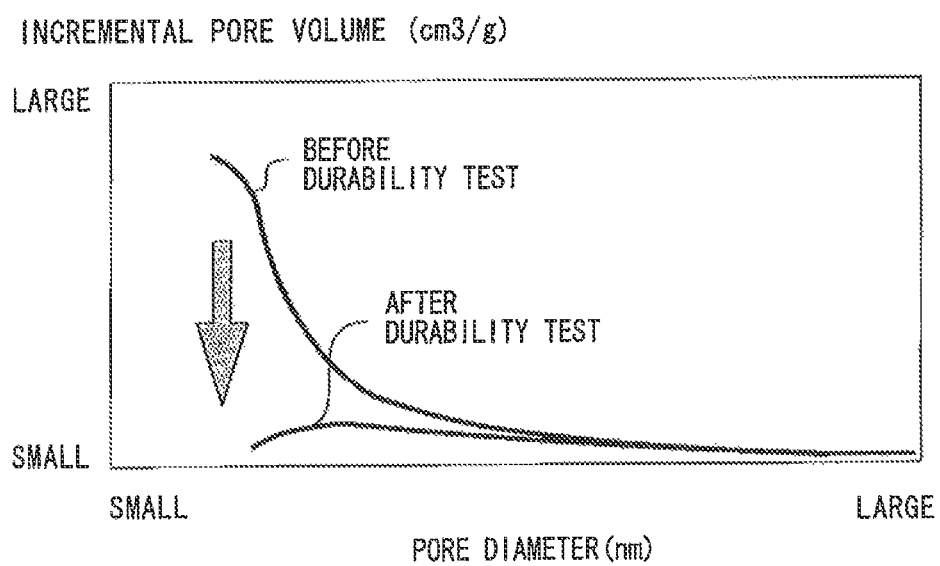
FIG. 5 is a diagram illustrating a change of incremental pore volume ($cm^3$/g) of activated carbon before and after an ozone purification durability test.

FIG. 5 is a diagram illustrating a change of incremental pore volume ($cm^3/g$) of activated carbon before and after an ozone purification durability test. As illustrated in FIG. 5, after the durability test, the incremental pore volume largely decreases from that before the durability test. This means that abundance ratio of the pores included in the activated carbon declines. This result comes from the invading of the various substances in the air or the active oxygen into the pores of the activated carbon, which supports the fact that the deterioration of the ozone purifying function is accelerated.

Figure 6:
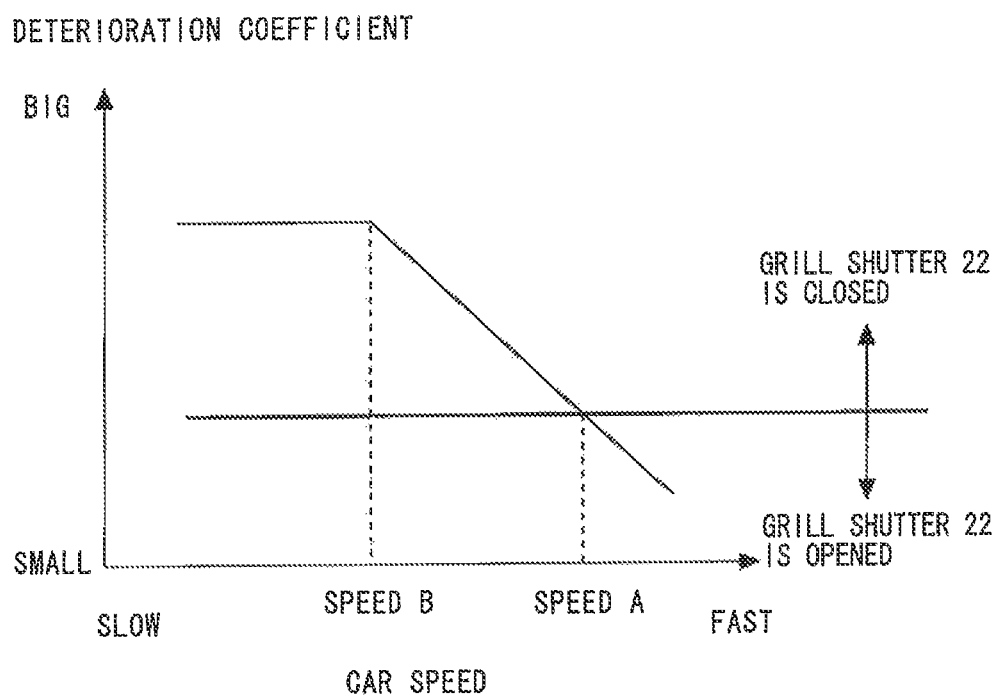
FIG. 6 is a graph showing a relationship between degradation coefficient of an activated carbon and car speed.

In the embodiment therefore the grill shutter 22 is controlled in closed condition when an environment surrounding the moving vehicle 10 is under a condition where the purifying function of the activated carbon deteriorates easily (an inflow control). The inflow control will be explained with reference to FIG. 6. FIG. 6 is a graph showing a relationship between degradation coefficient of an activated carbon and car speed. Here, the degradation coefficient is a parameter expressing ease of deterioration of the purifying function of the activated carbon. It means that the bigger the degradation coefficient, the environment is under a condition where the purifying function of the activated carbon more easily deteriorates.

In the inflow control, specifically, the grill shutter 22 is controlled in fully open condition when the car speed is within an area faster than Speed A shown in FIG. 6. When the car speed is slower than Speed A, the grill shutter 22 is controlled in closed condition as shown in FIG. 2 (A). As described above, ozone purification rate of the activated carbon correlates with the gas contact probability. Also, wind velocity of the gas passing through a radiator correlates with car speed. Therefore, the ozone purification rate of the activated carbon correlates with the car speed. And thus, the degradation coefficient of the activated carbon basically becomes bigger as the car speed slows down. When the car speed is within an area slower than Speed B shown in FIG. 6, the ozone purifying function of the activated carbon disappear with a extreme high rate and the degradation coefficient has a constant value (upper limit). If the inflow control with Speed A of FIG. 6 set as a threshold is performed, ozone can be purified by circumventing the speed area where the ozone purifying function of the activated carbon deteriorates easily thereby progression of deterioration in purifying function thereof can be suppressed successfully.

[Specific Processing of First Embodiment]

Figure 7:
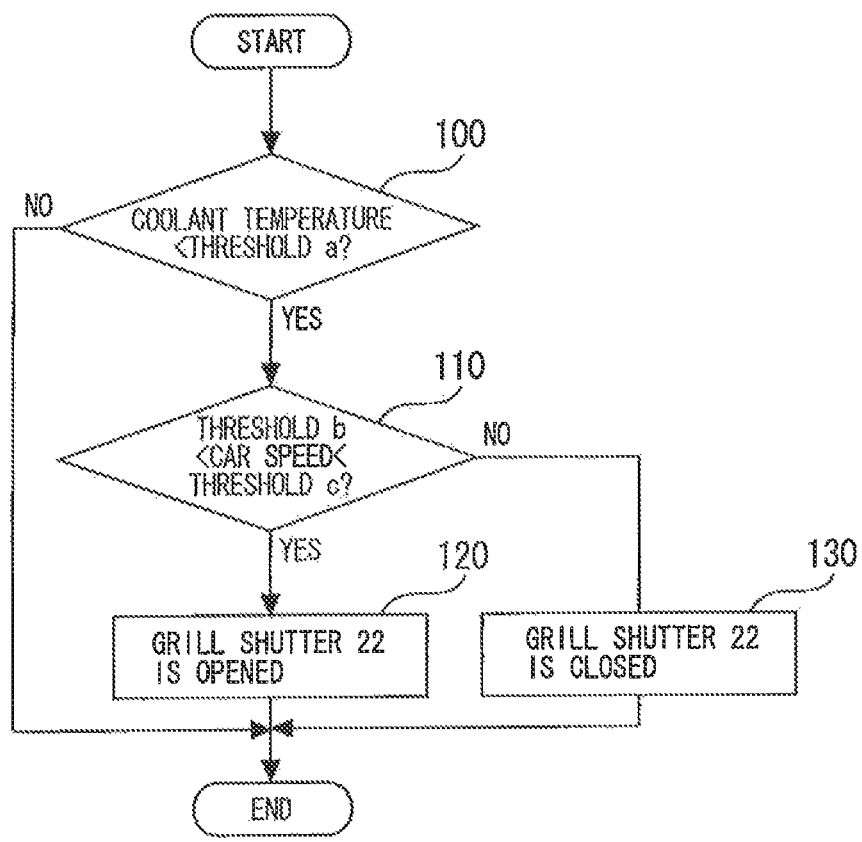
FIG. 7 is a flowchart showing an inflow control performed by an ECU 30 according to the embodiment.

Next, a specific processing for performing the inflow control described above will be explained with reference to FIG. 7. FIG. 7 is a flow chart showing the inflow control performed by the ECU 30 according to the embodiment. The routine shown in FIG. 7 is repeatedly executed at regular intervals after the engine 12 starts. And the grill shutter 12 is in fully closed condition before the engine start.

In the routine shown in FIG. 7, the ECU 30 firstly judges whether or not the coolant temperature of the engine 12 is lower than a threshold a (step 100). Specifically, ECU 30 acquires values detected from the water temperature sensor 26 and then compares the detected values with the threshold a. As the threshold a, an upper limited value of the coolant temperature of the engine 12 which is set in consideration of the area of the grill shutter 22 and stored in the ECU 30. The threshold a is set in order to avoid the engine 12 being insufficiently cooled by the performance of the inflow control. At the step 100, when the coolant temperature is judged at the threshold a or above, ECU 30 terminates the routine to prioritize a request for cooling the engine 12.

At the step 100, on the other hand, when the coolant temperature is judged lower than the threshold a, ECU 30 judges whether car speed is between thresholds b and c (step 110). Specifically, ECU 30 acquires values detected from the car speed sensor 24 and then compares the thresholds b and c with the detected values. As the threshold b, a corresponding value to the Speed A of FIG. 6 in which the ECU 30 stores is used. As the threshold c, an upper limit value of the car speed in which the ECU 30 stores is used. The threshold c is set because the gas contact probability becomes sufficiently small within a area faster than the threshold c.

At the step 110, when the car speed is judged between the thresholds b and c, the ECU 30 controls to maintain the grill shutter 22 in fully opened condition (step 120). On the other hand, at the step 110, when the car speed is judged out of the thresholds b and c, the ECU 30 controls the grill shutter 22 to turn in closed condition shown in FIG. 2 (A) (step 130). This will enable to reduce amount of air inflowing into the activated carbon thereby its ozone purifying function can be prevented from disappearing.

According to the routine shown in FIG. 7, when the coolant temperature is judged lower than the threshold a and also the car speed is judged slower than the threshold b, the grill shutter 22 is controlled in closed condition. Therefore, ozone can be purified by circumventing the speed area where the ozone purifying function of the activated carbon deteriorates easily. According to the routine shown in FIG. 7, when the coolant temperature is judged at the threshold a or above, the routine is terminated thereby avoid the engine 12 being insufficiently cooled by the performance of the inflow control while exerting above advantageous effects.

In the embodiment, meanwhile, activated carbon is coated on the fins of the radiator 14. However, an elemental metal such as manganese, iron, cobalt, nickel, copper, ruthenium, rhodium, palladium, silver, platinum, and gold, a metal complex or organometallic complex including one of these elemental metals as a center metal, or zeolite may be used with the activated carbon. Two types or more of the elemental metal, the metal complex, the organometallic complex and zeolite may be coated in combination.

In the embodiment, the grill shutter 22 is controlled in closed condition shown in FIG. 2 (A) when the car speed is slower than Speed A of FIG. 6. However, the closed condition may be changed. For example, the grill shutter 22 may be controlled in closed condition shown in FIG. 2 (B) in an area slower than Speed A shown in FIG. 6. Such an arrangement in closed condition may be changed arbitrarily in consideration of the area of the opening 20a or the grill shutter 22. Further, the switching of the grill shutter 22 may be variable, for example, the grill shutter 22 may be operated in response to the car speed. That is, various configurations can be applied as modified examples of the embodiment as long as the grill shutter 22 is switched to open and close at Speed A shown in FIG. 6.

Figure 8:
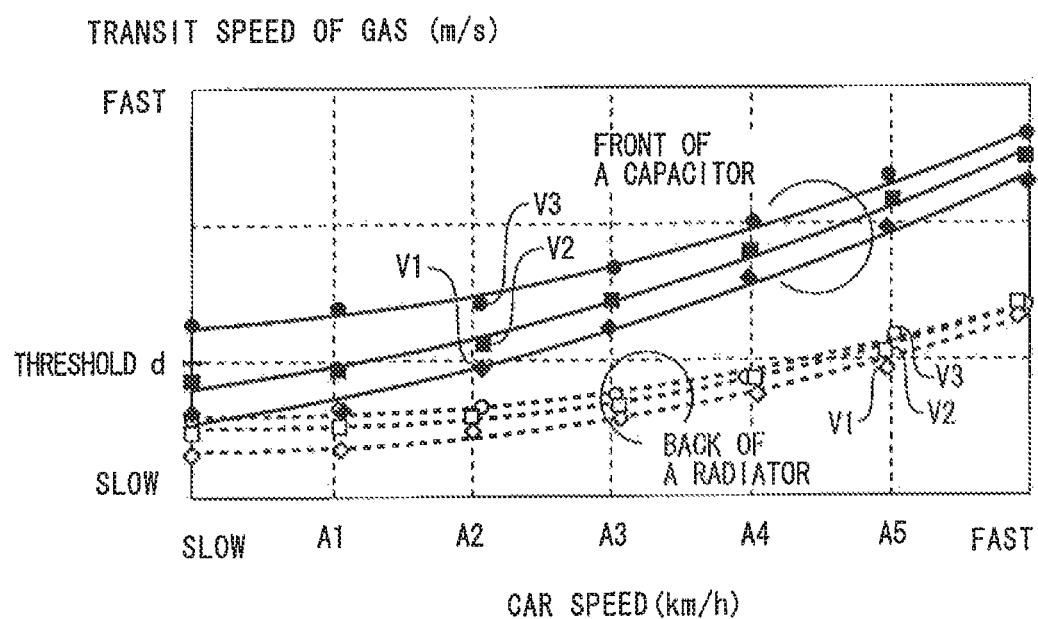
FIG. 8 is a graph showing relationships between operating voltage of a radiator fan (V) and transit speed of gas (m/s), and car speed (m/s) and the transit speed of gas (m/s).
Figure 9:
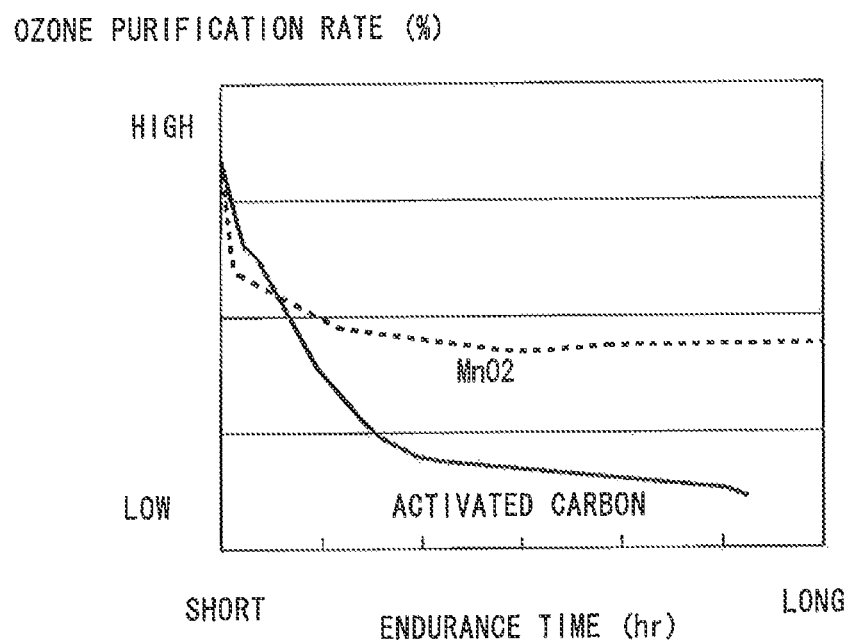
FIG. 9 is a diagram illustrating a temporal change of ozone purification rate (%) of activated carbon.

In the embodiment, the threshold is set with use of the car speed (specifically, Speed A of FIG. 6). However, the threshold may be set with factors other than the car speed. FIG. 8 is a graph showing relationships between operating voltage of a radiator fan (V) and transit speed of gas (m/s), and car speed (m/s) and the transit speed of gas (m/s). The characteristic curve of FIG. 8 is created by values detected from air speed meters arranged at the front of a capacitor of an air conditioner and the back of a radiator. As shown in FIG. 8, transit speed of gas becomes faster in accordance with the car speed. Here, magnitude relationship between the operating voltages is expressed as $V_1<V_2<V_3$. Then, if the car speed is constant, the transit speed of gas becomes faster as the operating voltage becomes higher. This is because that operating voltages of a radiator fan, in general, are separately computed by ECU in response to cooling requirements from an engine. If the radiator 18 of the embodiment is the one like this, a threshold can be set with use of velocity (i.e. operating voltages of a radiator fan and car speed). For example, if a threshold (threshold d) is set with use of velocity at the front of the capacitor 16, the threshold d is expressed by the case where the operating voltage is $V_1$ and also the car speed is $A_2$ or the case where the operating voltage is $V_2$ and also the car speed is $A_1$. In these cases, the grill shutter 22 may be switched to open and close.

Further, concentration of SOx, NOx, COx or PM may be applied as the factors other than the car speed. These concentrations are a factor which affects the activated carbon directly on the progression of deterioration in purifying function. Thus, if the threshold is set in consideration of the concentrations, the progression of deterioration in purifying function of the activated carbon can be successfully suppressed. The concentrations may be directly detected from a specialized sensor disposed on the vehicle 10 or be estimated from the detected value from the car speed sensor 24 or the air flow meter 28.

DESCRIPTION OF REFERENCE NUMERALS

10 vehicle
12 engine
14 radiator
16 capacitor
18 radiator fan
20 bumper grill
22 grill shutter
24 car speed sensor
26 water temperature sensor
28 air flow meter
30 ECU

The invention claimed is:
1. An air purification device for vehicles, comprising:
an on-vehicle component arranged on a portion where an air flow passage is formed while a vehicle is moving;
an ozone purifier which includes activated carbon while being provided on said on-vehicle component;
air inflow control means for controlling amount of air flowing into said ozone purifier; and
control means for closing said inflow control means when an operating condition of the vehicle is below a predetermined threshold so that amount of air flowing into said ozone purifier is reduced, and for opening said inflow control means when the operating condition of the vehicle is at or above the predetermined threshold so that amount of the air flowing into said ozone purifier is increased.

2. The air purification device for vehicles according to claim 1, wherein
said operating condition of the vehicle is a speed of the vehicle, and
said predetermined threshold is a predetermined vehicle speed.

3. The air purification device for vehicles according to claim 1, wherein
said on-vehicle component is a radiator, and
said predetermined threshold is a transit speed of air determined based on a predetermined vehicle speed and a predetermined operating voltage of a radiator fan which cools said radiator.

4. The air purification device for vehicles according to claim 1, wherein
said on-vehicle component is a radiator, and
said air inflow control means is a grill shutter which adjusts transitable area of a bumper grill by being switched by said control means to open and close.

5. An air purification device for vehicles, comprising:
an on-vehicle component arranged on a portion where an air flow passage is formed while a vehicle is moving;
an ozone purifier which includes activated carbon while being provided on said on-vehicle component;
an air inflow control device that controls amount of air flowing into said ozone purifier; and
a control device configured to close said inflow control device when an operating condition of the vehicle is below a predetermined threshold so that amount of air flowing into said ozone purifier is reduced and for opening said inflow control device when the operating condition of the vehicle is at or above the predetermined threshold so that amount of the air flowing into said ozone purifier is increased.

6. The air purification device for vehicles according to claim 5, wherein
said operating condition of the vehicle is a speed of the vehicle, and
said predetermined threshold is a predetermined vehicle speed.

7. The air purification device for vehicles according to claim 5, wherein
said on-vehicle component is a radiator, and
said predetermined threshold is a transit speed of air determined based on a predetermined vehicle speed and a predetermined operating voltage of a radiator fan which cools said radiator.

8. The air purification device for vehicles according to claim 5, wherein
said on-vehicle component is a radiator, and
said air inflow control device is a grill shutter which adjusts transitable area of a bumper grill by being switched by said control device to open and close.

* * * * *